United States Patent
Nian et al.

(10) Patent No.: US 9,413,603 B2
(45) Date of Patent: Aug. 9, 2016

(54) METHOD FOR IMPLEMENTING VIRTUAL NETWORK, AND NETWORK MANAGEMENT SYSTEM

(75) Inventors: Qingfei Nian, Shenzhen (CN); Tingzong He, Shenzhen (CN); Haohong Shi, Shenzhen (CN); Jinggang Li, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 206 days.

(21) Appl. No.: 14/382,321

(22) PCT Filed: Jun. 4, 2012

(86) PCT No.: PCT/CN2012/076429
§ 371 (c)(1),
(2), (4) Date: Sep. 1, 2014

(87) PCT Pub. No.: WO2013/152552
PCT Pub. Date: Oct. 17, 2013

(65) Prior Publication Data
US 2015/0113108 A1   Apr. 23, 2015

(30) Foreign Application Priority Data
Apr. 10, 2012 (CN) .......................... 2012 1 0103420

(51) Int. Cl.
*H04L 12/24* (2006.01)
*H04L 12/701* (2013.01)
*H04L 12/46* (2006.01)

(52) U.S. Cl.
CPC ........ *H04L 41/0806* (2013.01); *H04L 12/4641* (2013.01); *H04L 45/00* (2013.01); *H04L 41/12* (2013.01)

(58) Field of Classification Search
None
See application file for complete search history.

(56) References Cited

U.S. PATENT DOCUMENTS

| | | | |
|---|---|---|---|
| 7,411,915 B1 * | 8/2008 | Spain ................. | H04L 41/0806 370/250 |
| 7,467,215 B2 * | 12/2008 | Ould-Brahim ...... | H04L 12/4675 709/230 |

(Continued)

FOREIGN PATENT DOCUMENTS

| CN | 1878118 A | 12/2006 |
|---|---|---|
| CN | 101272618 A | 9/2008 |

(Continued)

OTHER PUBLICATIONS

International Search Report in international application No. PCT/CN2012/076429, mailed on Jan. 24, 2013.

(Continued)

*Primary Examiner* — Ranodhi Serrao
(74) *Attorney, Agent, or Firm* — Oppedahl Patent Law Firm LLC

(57) ABSTRACT

Disclosed are a method for implementing a virtual network and a network management system. With the method, a virtual network is created; multiple super ports each unique in the virtual network are created; a connection of a super port with a network element is configured; and when a service to pass through the virtual network or a nonterminal service interconnected to the virtual network is created, the super ports are used as routing resources of the service. With the disclosure, by using a virtual network as well as super ports and a connected group provided by the virtual network, an end-to-end service transparently passing through a third-party network can be created, such that unified transparent end-to-end service management may be provided at a customer side, greatly facilitating network management in this scenario, reducing a risk in network management and improving network reliability.

15 Claims, 3 Drawing Sheets

(56) References Cited

U.S. PATENT DOCUMENTS

| | | | | |
|---|---|---|---|---|
| 7,580,372 B2* | 8/2009 | Touve | H04L 12/4641 | 370/256 |
| 7,606,939 B1* | 10/2009 | Finn | H04L 12/4645 | 709/246 |
| 7,719,958 B1* | 5/2010 | Azimi | H04L 12/18 | 370/220 |
| 7,756,027 B1 | 7/2010 | Reddy | | |
| 7,792,100 B2* | 9/2010 | Hato | H04L 12/4633 | 370/389 |
| 7,869,432 B1* | 1/2011 | Mollyn | H04L 12/4625 | 370/221 |
| 7,877,483 B1* | 1/2011 | Finn | H04L 12/4641 | 370/256 |
| 7,881,314 B2* | 2/2011 | Regale | H04L 45/50 | 370/401 |
| 7,991,872 B2* | 8/2011 | Wong | H04L 12/4641 | 709/217 |
| 8,018,891 B2 | 9/2011 | Reddy | | |
| 2003/0012202 A1* | 1/2003 | Fukutomi | H04L 12/185 | 370/395.52 |
| 2003/0206548 A1* | 11/2003 | Bannai | H04L 12/42 | 370/389 |
| 2004/0042416 A1* | 3/2004 | Ngo | H04L 12/467 | 370/254 |
| 2004/0044754 A1* | 3/2004 | Virdy | H04L 12/462 | 709/223 |
| 2004/0049542 A1* | 3/2004 | Ould-Brahim | H04L 12/4641 | 709/203 |
| 2006/0248227 A1* | 11/2006 | Hato | H04L 12/4633 | 709/245 |
| 2007/0230357 A1* | 10/2007 | Lin | H04L 12/2697 | 370/241.1 |
| 2007/0253432 A1* | 11/2007 | Regale | H04L 12/465 | 370/395.53 |
| 2008/0159277 A1* | 7/2008 | Vobbilisetty | H04L 12/462 | 370/357 |
| 2008/0310421 A1* | 12/2008 | Teisberg | H04L 12/4641 | 370/395.53 |
| 2009/0119406 A1 | 5/2009 | Zhu | | |
| 2009/0279551 A1* | 11/2009 | Wong | H04L 12/4641 | 370/395.53 |
| 2011/0255538 A1* | 10/2011 | Srinivasan | H04L 41/0893 | 370/392 |
| 2012/0014284 A1* | 1/2012 | Ranganathan | H04L 49/70 | 370/254 |
| 2012/0072567 A1* | 3/2012 | Yin | G06F 13/102 | 709/223 |

FOREIGN PATENT DOCUMENTS

| | | |
|---|---|---|
| CN | 101729355 A | 6/2010 |
| CN | 102130831 A | 7/2011 |

OTHER PUBLICATIONS

English Translation of the Written Opinion of the International Search Authority in international application No. PCT/CN2012/076429, mailed on Jan. 24, 2013.

* cited by examiner

METHOD FOR IMPLEMENTING VIRTUAL NETWORK, AND NETWORK MANAGEMENT SYSTEM

TECHNICAL FIELD

The disclosure relates to the field of network management techniques, and in particular to a method for implementing a virtual network and a network management system in a bearer network system.

BACKGROUND

With the on-going development of communication techniques, there is an increasing number of types of services born by communication equipments. In order to decrease the quality risk in, and dependence on, equipments provided by a single equipment manufacturer, an operator tends to choose multiple equipment manufacturers, leading to hybrid networking of multiple types of equipments in one network. Meanwhile, there are services spanning different types of equipments and equipments of different manufacturers, which further complicates network management.

Sometimes, an end-to-end service established by an operator inevitably has to span different types of equipments of multiple equipment manufacturers, or even go across a network of another operator (i.e., a third-party operator network). As there is an increasingly higher customer requirement on quality of service in a network provided by an operator, the operator is required accordingly to manage the network so as to ensure quality of an end-to-end service. That is to say, both an end-to-end service to pass through different types of equipments of multiple equipment manufacturers and an end-to-end service to pass through a third-party operator network require transparent end-to-end management. In this case, a method for network management has to be proposed to solve the problems currently encountered in network management in an efficient, direct and reliable way.

At present, a direct network management method for an end-to-end service, capable of integrating equipments of multiple manufacturers and networks of multiple operators, is yet to be disclosed in related art. In managing equipments of multiple manufacturers by an existing network-level management system, a network under the management of the system has to be managed by a same operator without traversing an equipment of an unknown manufacturer or a third-party operator network. In related art, generally, when a service is to pass though an equipment of an unknown manufacturer or a third-party operator network, the service is first managed as a service segment nonterminal at a transmitting end or a receiving end; and is then managed as another service segment nonterminal at a transmitting end or a receiving end when leaving the equipment of an unknown manufacturer or the third-party operator network. Such a service exists as two or more service segments in a network management system, which makes network management very inconvenient. Furthermore, since service segments are not necessarily associated with each other, some of the service segments may be deleted by mistake during management, such that the whole service may be interrupted, which will cause great loss to a customer.

With virtual Network Element (NE) techniques, the problem encountered in passing through an equipment of an unknown manufacturer or a third-party operator network is solved. However, as an existing virtual network element in concept is essentially a virtual device, notable problems still exist in practical applications, as briefly introduced below with a specific example.

Shown in FIG. 1 is a scenario of multipoint-to-multipoint traverse in a Packet Transport Network (PTN), where a 10 Gibit/s Ethernet (GE) interface of a network element NE_A, and GE interfaces of network elements NE_B, NE_C and NE_D, are each configured with a service Virtual Local Area Network (VLAN) and a service IP. If a virtual network element or an offline network element is used to simulate an IP network, in practical applications, for a static service, information on a next hop required to be configured may point to an incorrect next hop. For an example of a service from NE_A to NE_B, according to a configuration, a next hop of the service of NE_A should be NE_D; however if a virtual network element or an offline network element is used to simulate the IP network, the next hop of the service of NE_A will be a virtual network element instead of NE_D.

In general, existing virtual network element techniques are based on a virtual device, with the essence being to replace an equipment of a third-party manufacturer with a virtual network element managed as a black box, white box or grey box management approach, and have disadvantages as follows.

(1) With existing virtual network element techniques based on replacement of an equipment of a third-party manufacturer with a virtual network element, configuration corresponding to equipment resources has to be reflected.

(2) An existing virtual network element lacks any network feature, failing to meet a requirement of network configuration and management.

(3) An existing virtual network element, merely as a basic unit and a special case of a network, leads to a model difficult to be managed.

SUMMARY

In view of the above, it is desired that embodiments of the disclosure provide a method for implementing a virtual network and a network management system in a bearer network system, capable of transparent end-to-end management over an equipment of an unknown manufacturer as well as a third-party operator network.

To this end, the disclosure adopts a technical solution as follows.

A method for implementing a virtual network, applied in a network management system, includes steps of:

creating a virtual network;

creating multiple super ports each unique in the virtual network;

configuring a connection of a super port with a network element; and when creating a service to pass through the virtual network or a nonterminal service interconnected to the virtual network, using the super ports as routing resources of the service to pass through the virtual network or the nonterminal service interconnected to the virtual network.

In an embodiment, each of the super ports may be configured for connecting a port of an arbitrary type.

In an embodiment, each of the super ports may be a transparent super port or a non-transparent super port, wherein the transparent super port is a port via which a service passes through the virtual network directly; and the non-transparent port is a port via which a service cannot pass through the virtual network directly, but passes through the virtual network further via a service configured inside the virtual network; or the non-transparent port is a port used as an endpoint of a nonterminal service interconnected to the virtual network.

In an embodiment, the method may further include a step of: after the step of creating multiple super ports each unique in the virtual network, creating at least one connected group including multiple of the super ports, wherein each of the at least one connected group may include at least an identification of the connected group, a user label, and information on configured connectivity among the multiple of the super ports.

In an embodiment, the step of using the super ports as routing resources of the service to pass through the virtual network or the nonterminal service interconnected to the virtual network may include: using a super port included in a connected group corresponding to the service to pass through the virtual network or the nonterminal service interconnected to the virtual network as the routing resources of the service to pass through the virtual network or the nonterminal service interconnected to the virtual network, and using a link provided by the virtual network as a service layer link.

In an embodiment, the method may further include:

when creating the service to pass through the virtual network, routing the service through the virtual network by: acquiring first a source transparent super port in the virtual network; then acquiring a target super port corresponding to the source transparent super port and a connected group to which the source transparent super port belongs; and then acquiring a network element connected to the target super port and located outside the virtual network; or when creating the service to pass through the virtual network, routing the service through the virtual network by: acquiring first a source non-transparent super port in the virtual network; then acquiring a target super port corresponding to the source non-transparent super port and a service configuration related to the source non-transparent super port; and then acquiring a network element connected to the target super port and located outside the virtual network; or when creating the nonterminal service interconnected to the virtual network, acquiring a destination non-transparent super port in the virtual network, and interconnecting the nonterminal service to the virtual network via the destination non-transparent super port.

In an embodiment, the method may further include: inquiring about, modifying, or deleting, via a network management system, the virtual network and a super port created.

In an embodiment, the method may further include: inquiring about, modifying, or deleting, via a network management system, a created connected group.

The disclosure further provides a network management system, including:

a virtual network management module configured for: creating a virtual network, creating multiple super ports each unique in the virtual network, and configuring a connection of a super port with a network element; and a service management module configured for: when creating a service to pass through the virtual network or a nonterminal service interconnected to the virtual network, using the super ports as routing resources of the service to pass through the virtual network or the nonterminal service interconnected to the virtual network.

In an embodiment, each of the super ports may be configured for connecting a port of an arbitrary type.

In an embodiment, each of the super ports may be a transparent super port or a non-transparent super port, wherein the transparent super port is a port via which a service passes through the virtual network directly; and the non-transparent port is a port via which a service cannot pass through the virtual network directly, but passes through the virtual network further via a service configured inside the virtual network; or the non-transparent port is a port used as an endpoint of a nonterminal service interconnected to the virtual network.

In an embodiment, the virtual network management module may be further configured for: creating at least one connected group including multiple of the super ports, wherein each of the at least one connected group may include at least an identification of the connected group, a user label, and information on configured connectivity among the multiple of the super ports; and the service management module may be configured for: when creating the service to pass through the virtual network or the nonterminal service interconnected to the virtual network, using a super port included in a connected group corresponding to the service to pass through the virtual network or the nonterminal service interconnected to the virtual network as the routing resources of the service to pass through the virtual network or the nonterminal service interconnected to the virtual network, and using a link provided by the virtual network as a service layer link.

In an embodiment, the service management module may be configured for:

when creating the service to pass through the virtual network, routing the service through the virtual network by: acquiring first a source transparent super port in the virtual network; then acquiring a target super port corresponding to the source transparent super port and a connected group to which the source transparent super port belongs; and then acquiring a network element connected to the target super port and located outside the virtual network; or when creating the service to pass through the virtual network, routing the service through the virtual network by: acquiring first a source non-transparent super port in the virtual network; then acquiring a target super port corresponding to the source non-transparent super port and a service configuration related to the source non-transparent super port; and then acquiring a network element connected to the target super port and located outside the virtual network; or when creating the nonterminal service interconnected to the virtual network, acquiring a destination non-transparent super port in the virtual network, and interconnecting the nonterminal service to the virtual network via the destination non-transparent super port.

In an embodiment, the virtual network management module may be further configured for inquiring about, modifying, or deleting the virtual network, a super port, and/or a connected group created.

In an embodiment, the system may further include at least one of a topology presenting module, a topological link management module, a protecting module, a maintaining module and a storing module, wherein the topology presenting module is configured for presenting topology of the virtual network;

the topological link management module is configured for creating, deleting, modifying or inquiring about a topological link between the virtual network and another network element or network;

the protecting module is configured for protecting configuration information on the network management system by treating the virtual network as an identifiable network resource;

the maintaining module is configured for maintaining the configuration information on the network management system by treating the virtual network as an identifiable network resource; and the storing module is configured for storing information on the virtual network, a super port, and a connected group.

It can be seen through an aforementioned technical solution of the disclosure that by using a virtual network as well as super ports and a connected group provided by the virtual network, an end-to-end service transparently passing through a third-party network can be created, such that unified transparent end-to-end service management may be provided at a customer side, greatly facilitating network management in this scenario, reducing a risk in network management and improving network reliability.

BRIEF DESCRIPTION OF THE DRAWINGS

Drawings illustrated herein are used to provide further understanding of the disclosure and constitute a part of the disclosure. Illustrative embodiments of the disclosure and their description are used to explain the disclosure and should not be construed as limitation to the disclosure. Wherein.

DETAILED DESCRIPTION

According to embodiments of the disclosure, a virtual network is created; multiple super ports each unique in the virtual network are created; a connection of a super port with a network element is configured; and when a service to pass through the virtual network or a nonterminal service interconnected to the virtual network is created, the super ports are used as routing resources of the service.

To clearly show a technical problem to be solved, a technical solution, and beneficial effects of the present disclosure, the present disclosure is further elaborated below with reference to the drawings and embodiments. Note that specific embodiments described herein are merely for explaining the present disclosure, and are not intended to limit the present disclosure.

Figure 1:
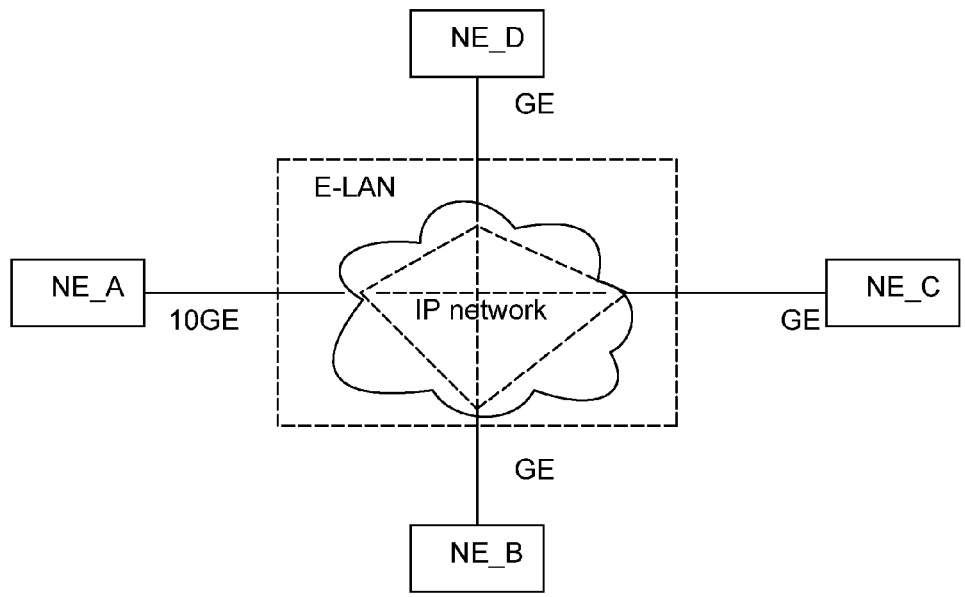
FIG. 1 is a schematic diagram of a scenario of a PTN multipoint-to-multipoint service traversing an IP network in related art.
Figure 2:
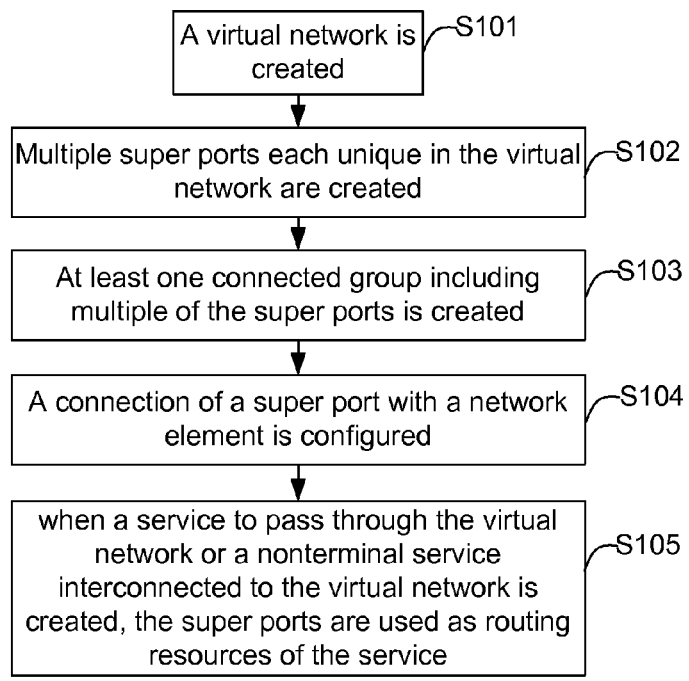
FIG. 2 is a flow chart of implementing a virtual network according to an embodiment of the disclosure.

FIG. 2 is a flow chart of implementing a virtual network according to an embodiment of the disclosure, specifically as follows.

A method for implementing a virtual network, applies in a network management system, and includes steps as follows.

In S101, a virtual network is created.

In S102, multiple super ports each unique in the virtual network are created, where each super port has a unique port identification (ID) in the virtual network; and another port attribute, such as a user label, may be specified for a super port.

In S104, a connection of a super port with a network element is configured.

In S105, when a service to pass through the virtual network or a nonterminal service interconnected to the virtual network is created, the super ports are used as routing resources of the service.

In S101, the virtual network represents a network management range, and may emulate a multipoint interworking service-layer network, including a service-layer network of point-to-point, point-to-multipoint, or multipoint-to-multipoint interworking. In S102, a super port may have at least a port identification unique in the virtual network and a user label. A super port may be configured for physically or logically connecting a port of an arbitrary type, and may serve as a physical port or a logical port. A super port may be a transparent super port or a non-transparent super port depending on whether a third-party network can be traversed transparently via the super port.

The transparent super port is a port via which a service can pass through the virtual network directly. The non-transparent port is a port via which a service cannot pass through the virtual network directly, but passes through the virtual network further via a service configured inside the virtual network; or the non-transparent port is a port used as an endpoint of a nonterminal service interconnected to the virtual network.

The transparent super port is configured for emulating creation of a port for a service to transparently traverse a third-party network. Traverse by a transparent super port corresponds to a customer service layer mode, where a connected group of the virtual network serves as a service layer of a network interconnected to the transparent super port. The non-transparent super port is configured for emulating creation of a port via which a service is interconnected to a third-party network. Traverse by a non-transparent super port corresponds to a peer-to-peer model, where mutually visible service interworking exists between the virtual network and a network interconnected to the virtual network.

In S104, a connection of a super port with a physical or logical port of a network element is configured.

In S105, in creating an end-to-end service, the super ports are used as routing resources of the service; a route may be selected as passing through or not passing through a super port; during the routing, the virtual network is identified and processed by being regarded as a multipoint interworking service-layer network and processed equally as another service layer link.

In an embodiment, after multiple super ports each having a port identification unique in the virtual network and a user label are created, the method for implementing a virtual network may further include a step as follows.

In S103, at least one connected group including multiple of the super ports is created. A connected group may include an identification of the connected group, a user label, and information on configured connectivity among the multiple of the super ports.

In S103, at least one connected group is created for specified super ports of the virtual network in the network management system. A connected group is used to specify connectivity among the specified super ports. A connected group includes at least an identification of the connected group, a user label, member super ports in the connected group, and configured connectivity among the member super ports. A super port of the virtual network may serve as a member of multiple connected groups. Each connected group includes two or more super ports. Super ports within each connected group may be in service interworking, while two super ports respectively in two different connected groups are not in service interworking.

In addition, the configured connectivity among super ports within a connected group defines a connection relation among member super ports of the connected group, including point-to-point connection, multipoint full connection, multipoint partial connection, and a direction of connection. The direction of connection may include a unidirectional connection and a bidirectional connection.

During specific implementation, the virtual network and a super port created may be inquired about, modified or deleted via the network management system. A created connected group may be inquired about, modified or deleted via the network management system.

In an embodiment, after virtual network, super port and connected group creation completes, in S105, a super port included in a connected group corresponding to the service to pass through the virtual network or the nonterminal service interconnected to the virtual network may be used as the routing resources of the service, such that a link provided by the virtual network may be used as a service layer link.

According to an embodiment of the disclosure, in creating the service to pass through the virtual network, the service may be routed through the virtual network by: acquiring first a source transparent super port in the virtual network; then acquiring a target super port corresponding to the source transparent super port and a connected group to which the source transparent super port belongs; and then acquiring a network element connected to the target super port and located outside the virtual network.

Alternatively, according to an embodiment of the disclosure, in creating the service to pass through the virtual network, the service may be routed through the virtual network by: acquiring first a source non-transparent super port in the virtual network; then acquiring a target super port corresponding to the source non-transparent super port and a service configuration related to the source non-transparent super port; and then acquiring a network element connected to the target super port and located outside the virtual network.

Alternatively, according to an embodiment of the disclosure, in creating the nonterminal service interconnected to the virtual network, a destination non-transparent super port in the virtual network may be acquired, and the nonterminal service may thus be interconnected to the virtual network via the destination non-transparent super port.

Figure 3:
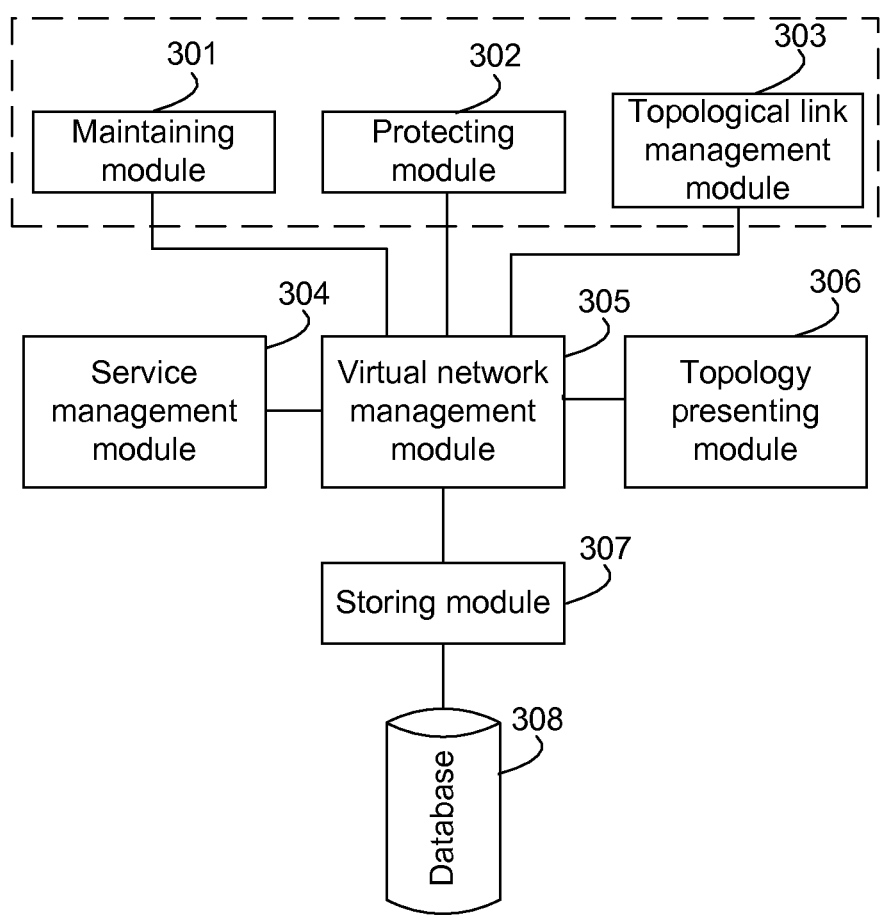
FIG. 3 is a schematic diagram of a modular structure of a network management system according to an embodiment of the disclosure.

Accordingly, embodiments of the disclosure further provide a network management system. As shown in FIG. 3, the network management system includes:

a virtual network management module 305 configured for: creating a virtual network, creating multiple super ports each unique in the virtual network, and configuring a connection of a super port with a network element; and a service management module 304 configured for: when creating a service to pass through the virtual network or a nonterminal service interconnected to the virtual network, using the super ports as routing resources of the service to pass through the virtual network or the nonterminal service interconnected to the virtual network.

A super port created by the virtual network management module 305 may be configured for physically or logically connecting a port of an arbitrary type.

A super port may be a transparent super port or a non-transparent super port depending on whether a third-party network can be traversed transparently via the super port.

The transparent super port is a port via which a service can pass through the virtual network directly.

The non-transparent port is a port via which a service cannot pass through the virtual network directly, but passes through the virtual network further via a service configured inside the virtual network; or the non-transparent port is a port used as an endpoint of a nonterminal service interconnected to the virtual network.

In addition, the virtual network management module 305 may be further configured for: creating at least one connected group including multiple of the super ports, where each of the at least one connected group may include at least an identification of the connected group, a user label, and information on configured connectivity among the multiple of the super ports, such that the service management module 304 may be configured for: when creating the service to pass through the virtual network or the nonterminal service interconnected to the virtual network, using a super port included in a connected group corresponding to the service as the routing resources of the service, such that a link provided by the virtual network may be used as a service layer link.

In an embodiment, the virtual network management module 305 may be further configured for inquiring about, modifying, or deleting the virtual network, a super port, and/or a connected group created.

In an embodiment, the service management module 304 may be configured for: when creating the service to pass through the virtual network, routing the service through the virtual network by: acquiring first a source transparent super port in the virtual network; then acquiring a target super port corresponding to the source transparent super port and a connected group to which the source transparent super port belongs; and then acquiring a network element connected to the target super port and located outside the virtual network.

Alternatively, in an embodiment, the service management module 304 may be configured for: when creating the service to pass through the virtual network, routing the service through the virtual network by: acquiring first a source non-transparent super port in the virtual network; then acquiring a target super port corresponding to the source non-transparent super port and a service configuration related to the source non-transparent super port (such as information on a connected group); and then acquiring a network element connected to the target super port and located outside the virtual network.

Alternatively, in an embodiment, the service management module 304 may be configured for: when creating the non-terminal service interconnected to the virtual network, acquiring a destination non-transparent super port in the virtual network, such that the nonterminal service may be interconnected to the virtual network via the destination non-transparent super port.

In an embodiment, the network management system may further include at least one of a topology presenting module 306, a topological link management module 303, a protecting module 302, a maintaining module 301 and a storing module 307.

The topology presenting module 306 may be configured for presenting topology of the virtual network.

The topological link management module 303 may be configured for creating, deleting, modifying or inquiring about a topological link between the virtual network and another network element or network.

The protecting module 302 may be configured for protecting configuration information on the network management system by treating the virtual network as an identifiable network resource.

The maintaining module 301 may be configured for maintaining the configuration information on the network management system by treating the virtual network as an identifiable network resource.

The storing module 307 may be configured for storing information on the virtual network, a super port, and a connected group.

In the embodiment, the virtual network management module 305 may be configured for managing an entity of a virtual network, including: creating, deleting, modifying or inquiring about the virtual network, and interacting with the storing module 307 to store the virtual network; creating, deleting, modifying or inquiring about a super port, configuring a connected group including information on connectivity among super ports, and interacting with the storing module 307 to store super ports and the connected group; providing another application module with information on configuration of the virtual network, super ports and a connected group; and exchanging information on service configuration of the virtual network with the end-to-end service management module 304.

The service management module 304 may be configured for creating an end-to-end service, and creating a service passing through the virtual network by taking the virtual network as a multipoint interworking service-layer network according to the information on super ports and a connected group provided by the virtual network management module 305.

The topology presenting module 306 may be configured for presenting topology of the virtual network. The virtual network may be presented in the same network topology together with other network topological elements. A direct topological connection between the virtual network and another network management unit is also presented as a topological link.

The topological link management module 303 may be configured for creating, deleting, modifying or inquiring about a topological link between the virtual network and another network element or network, and interacting with the storing module 307 to store a topological link.

The protecting module 302 may be configured for processing configuration related to protection in the network management system by treating the virtual network as an identifiable network resource. For example, a service protection group may be created for a service passing through a super port, such that protection switch may be performed on the service passing through a super port.

The maintaining module 301 is configured for processing configuration related to maintenance in the network management system by treating the virtual network as an identifiable network resource. For example, Maintenance Entity Group (MEG) configuration and inquisition issued by an end-to-end module is supported, such that a maintaining operation may be issued to a super port.

The storing module may be configured for storing information on the virtual network, a super port, and a connected group in a database 308.

Figure 4:
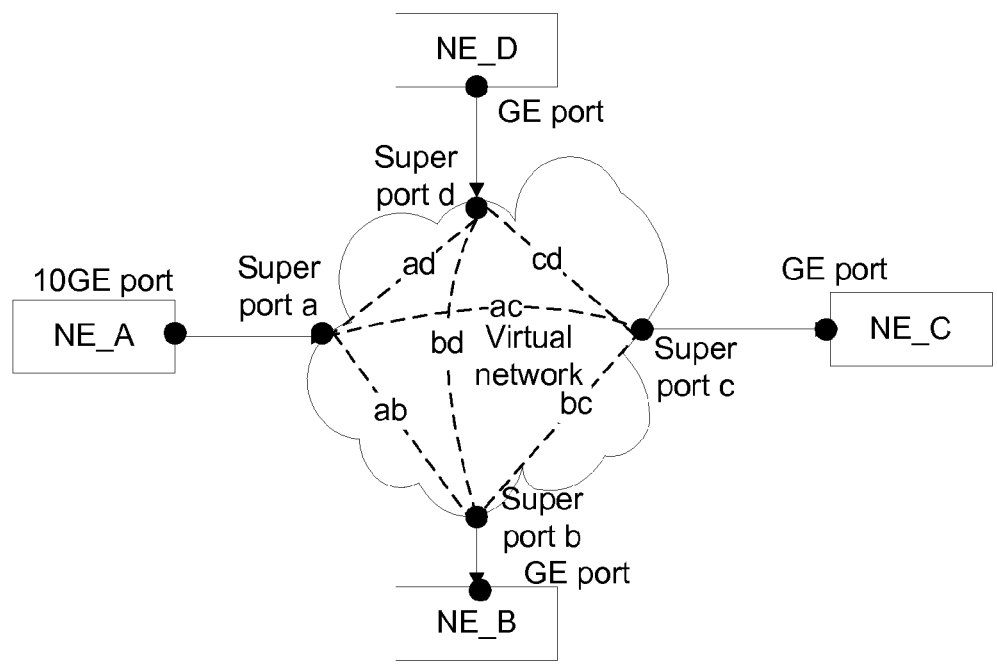
FIG. 4 is a schematic diagram of traversing an IP network using a virtual network according to an embodiment of the disclosure.

Refer to FIG. 4, which reveals a schematic diagram of traversing an IP network using a virtual network according to an embodiment of the disclosure.

In FIG. 4, a user creates, in physical topology, a virtual network connecting multiple network elements. Super ports are created in the virtual network. Ports of equipments accessing the virtual network as shown in FIG. 4 are configured to be in full connection. A 10GE port of a network element NE_A and GE interfaces of network elements NE_B, NE_C and NE_D are connected respectively to super ports a, b, c and d in the virtual network. The four PTN network elements NE_A, NE_B, NE_C and NE_D are fully connected with each other through the virtual network. Alternatively, isolation may be performed such that ports are configured to be in partial connection by setting connectivity among super ports. The virtual network as shown in FIG. 4 exists as a service layer of a service passing through the virtual network.

In the virtual network as shown in FIG. 4, a connected group may be configured to include, for example, 6 links respectively connecting 6 pairs of super ports, namely, a-b, a-c, a-d, b-c, b-d, and c-d. In this way, when an end-to-end service is created, a link provided by the virtual network is taken as a service layer link according to information on super ports and a connected group provided by the virtual network management module 305. In FIG. 2, six service layer links, i.e., NE_A-NE_B, NE_A-NE_C, NE_A-NE_D, NE_B-NE_C, NE_B-NE_D and NE_C-NE_D, will be formed. These service layer links are actually provided by combining the virtual network and physical links connecting the virtual network.

Further referring to FIG. 2, a flow of implementing a method for implementing a virtual network according to an embodiment of the disclosure will be elaborated below.

In S101, in a network management system, a virtual network is created according to a network range which needs to be managed but has no actual network element entity, and is given an identification unique in the whole network.

In S102, in the network management system, a virtual network is specified, a super port belonging to the virtual network is created, and is given an identification unique in the whole virtual network. The super port doesn't have a port type, and may not have a position attribute, i.e., the super port may not have positioning information such as a rack, a shelf or a slot. Alternatively, positioning information may be configured for the super port. Super ports are distinguished by IDs. A super port has a user label so as to facilitate establishing a topological link with a port of a network element. In specific implementation, a super port is a transparent super port by default, i.e., the virtual network including the super port can be traversed transparently. Alternatively, a super port may be configured as a non-transparent super port, which cannot be traversed by a service created, and can only serve as endpoint A or Z of a nonterminal service.

In S103, a connection between a super port and a port of a network element outside the virtual network is created. One or more connections between each super port and a physical or logical port of a network element may be established, as long as the pair of ports A, Z is unique. In certain cases, a super port may be expanded into matching sub-channels according to the rate of a network element port which is outside the virtual network and is connected to the super port. For example, if the port of the network element outside the virtual network is a Time-Division Multiplexing (TDM) port, the super port may then be expanded according to an STM-N 3-7-3 structure, and the expanded super port may be configured with connections of various rates (VC-4, VC-3, VC-12 and VC11) to the opposite port. Moreover, after a connection between a super port and the port of a network element outside the virtual network is configured, a service parameter of the same type as that of an opposite port of the super port may be specified for the super port according to characteristics of the opposite port.

In S104, a super-port-based connected group is created. A connected group with point-to-point connection may be created, or a connected group with connection among multiple points may be created. But an endpoint of one connected group must be different from that of another connected group. An identification (being unique in the virtual network) and a user label are specified for a connected group. Member super ports of a connected group, as well as connectivity among the member super ports, are configured. Super ports included in the virtual network are divided into multiple connected groups each including two or more super ports. The connectivity of each pair of ports in each connected group is configured as "connected" or "not connected". In addition, a direction of a connection is also configured, including unidirectional connection and bidirectional connection. The unidirectional connection includes connection in receiving direction and connection in transmitting direction.

In S105, a service to pass through the virtual network or a nonterminal service interconnected to the virtual network is configured. During specific implementation, different results may be returned depending on different service types.

For a tunnel service, only a transparent super port configured with a physical topological link is returned; for a customer service, only a transparent port configured with no physical link is returned. In service route configuration. A second super port connected to a found first super port is directly searched for, then a port (of a network element outside the virtual network) connected to the second super port is found, thus routing the service through the virtual network.

To create a nonterminal service interconnected to the virtual network, it is required to inquire about a non-transparent port connected to the network element, and take the non-transparent port as the port A or port Z of the service. However, the service cannot pass through the virtual network.

The above description illustrates and describes embodiments of the present disclosure, however as mentioned above, it should be understood that the present disclosure is not limited to the forms disclosed herein; the forms should not be construed as exclusion of other embodiments, but may apply to various other combinations, modifications and contexts, and can be altered according to the above teaching or techniques or knowledge in related art within the scope of the present disclosure. Any modification or alteration made by the skilled in the art without departing form the spirit and scope of the present disclosure should fall in the protection scope of the appended claims of the present disclosure.

INDUSTRIAL APPLICABILITY

In the method for implementing a virtual network and a network management system provided in the disclosure, a virtual network is created; multiple super ports each unique in the virtual network are created; a connection of a super port with a network element is configured; and when a service to pass through the virtual network or a nonterminal service interconnected to the virtual network is created, the super ports are used as routing resources of the service. In this way, by using a virtual network as well as super ports and a connected group provided by the virtual network, an end-to-end service transparently passing through a third-party network can be created such that unified transparent end-to-end service management may be provided at a customer side, greatly facilitating network management in this scenario, reducing a risk in network management and improving network reliability.

The invention claimed is:

1. A method for implementing a virtual network, applied in a network management system, the method comprising steps of:
creating a virtual network;
creating multiple super ports each unique in the virtual network;
creating at least one connected group including multiple of the super ports, wherein each of the at least one connected group comprises at least an identification of the connected group, a user label, and information on configured connectivity among the multiple of the super ports;
configuring a connection of a super port with a network element; and
when creating a service to pass through the virtual network or a nonterminal service interconnected to the virtual network, using the super ports as routing resources of the service to pass through the virtual network or the nonterminal service interconnected to the virtual network;
using a super port included in a connected group corresponding to the service to pass through the virtual network or the nonterminal service interconnected to the virtual network as the routing resources of the service to pass through the virtual network or the nonterminal service interconnected to the virtual network, and using a link provided by the virtual network as a service layer link.

2. The method according to claim 1, wherein each of the super ports is configured for connecting a port of an arbitrary type.

3. The method according to claim 2, wherein each of the super ports is a transparent super port or a non-transparent super port, wherein
the transparent super port is a port via which a service passes through the virtual network directly; and
the non-transparent port is a port via which a service cannot pass through the virtual network directly, but passes through the virtual network further via a service configured inside the virtual network; or the non-transparent port is a port used as an endpoint of a nonterminal service interconnected to the virtual network.

4. The method according to claim 1, wherein each of the super ports is a transparent super port or a non-transparent super port, wherein
the transparent super port is a port via which a service passes through the virtual network directly; and
the non-transparent port is a port via which a service cannot pass through the virtual network directly, but passes through the virtual network further via a service configured inside the virtual network; or the non-transparent port is a port used as an endpoint of a nonterminal service interconnected to the virtual network.

5. The method according to claim 1, further comprising:
when creating the service to pass through the virtual network, routing the service through the virtual network by: acquiring first a source transparent super port in the virtual network; then acquiring a target super port corresponding to the source transparent super port and a connected group to which the source transparent super port belongs; and then acquiring a network element connected to the target super port and located outside the virtual network; or
when creating the service to pass through the virtual network, routing the service through the virtual network by: acquiring first a source non-transparent super port in the virtual network; then acquiring a target super port corresponding to the source non-transparent super port and a service configuration related to the source non-transparent super port; and then acquiring a network element connected to the target super port and located outside the virtual network; or
when creating the nonterminal service interconnected to the virtual network, acquiring a destination non-transparent super port in the virtual network, and interconnecting the nonterminal service to the virtual network via the destination non-transparent super port.

6. The method according to claim 1, further comprising: inquiring about, modifying, or deleting, via a network management system, the virtual network and a super port created.

7. The method according to claim 1, further comprising: inquiring about, modifying, or deleting, via a network management system, a created connected group.

8. The method according to claim 1, further comprising: inquiring about, modifying, or deleting, via a network management system, a created connected group.

9. A network management system, comprising:
a virtual network management module configured for:
creating a virtual network, creating multiple super ports each unique in the virtual network, and configuring a connection of a super port with a network element and
creating at least one connected group including multiple of the super ports, wherein each of the at least one connected group comprises at least an identification of the connected group, a user label, and information on configured connectivity among the multiple of the super ports;
a service management module configured for:
when creating a service to pass through the virtual network or a nonterminal service interconnected to the virtual network, using the super ports as routing resources of the service to pass through the virtual network or the nonterminal service interconnected to the virtual network and using a super port included in a connected group corresponding to the service to pass through the virtual network or the nonterminal service interconnected to the virtual network as the routing resources of the service to pass through the virtual network or the nonterminal service interconnected to the virtual network, and using a link provided by the virtual network as a service layer link.

10. The system according to claim 9, wherein each of the super ports is configured for connecting a port of an arbitrary type.

11. The system according to claim 10, wherein each of the super ports is a transparent super port or a non-transparent super port, wherein
the transparent super port is a port via which a service passes through the virtual network directly; and
the non-transparent port is a port via which a service cannot pass through the virtual network directly, but passes through the virtual network further via a service configured inside the virtual network; or the non-transparent port is a port used as an endpoint of a nonterminal service interconnected to the virtual network.

12. The system according to claim 9, wherein each of the super ports is a transparent super port or a non-transparent super port, wherein
the transparent super port is a port via which a service passes through the virtual network directly; and
the non-transparent port is a port via which a service cannot pass through the virtual network directly, but passes through the virtual network further via a service configured inside the virtual network; or the non-transparent port is a port used as an endpoint of a nonterminal service interconnected to the virtual network.

13. The system according to claim 1, wherein the service management module is configured for: when creating the service to pass through the virtual network, routing the service through the virtual network by: acquiring first a source transparent super port in the virtual network; then acquiring a target super port corresponding to the source transparent super port and a connected group to which the source transparent super port belongs; and then acquiring a network element connected to the target super port and located outside the virtual network; or
when creating the service to pass through the virtual network, routing the service through the virtual network by: acquiring first a source non-transparent super port in the virtual network; then acquiring a target super port corresponding to the source non-transparent super port and a service configuration related to the source non-transparent super port; and then acquiring a network element connected to the target super port and located outside the virtual network; or
when creating the nonterminal service interconnected to the virtual network, acquiring a destination non-transparent super port in the virtual network, and interconnecting the nonterminal service to the virtual network via the destination non-transparent super port.

14. The system according to claim 9, wherein the virtual network management module is further configured for inquiring about, modifying, or deleting the virtual network, a super port, and/or a connected group created.

15. The system according to claim 9, further comprising at least one of a topology presenting module, a topological link management module, a protecting module, a maintaining module and a storing module, wherein
the topology presenting module is configured for presenting topology of the virtual network;
the topological link management module is configured for creating, deleting, modifying or inquiring about a topological link between the virtual network and another network element or network;
the protecting module is configured for protecting configuration information on the network management system by treating the virtual network as an identifiable network resource;
the maintaining module is configured for maintaining the configuration information on the network management system by treating the virtual network as an identifiable network resource; and
the storing module is configured for storing information on the virtual network, a super port, and a connected group.

* * * * *